Patented June 3, 1952

2,598,897

UNITED STATES PATENT OFFICE 2,598,897

PURIFICATION OF TITANIUM TETRACHLORIDE

Helmut Espenschied, Metuchen, N. J., assignor to National Lead Company, New York, N. Y., a corporation of New Jersey No Drawing. Original application April 12, 1949, Serial No. 87,112. Divided and this application July 20, 1950, Serial No. 175,029

8 Claims. (Cl. 202—57)

This invention relates to the purification of titanimum tetrachloride, more specifically it relates to a simple and economical process for purifying the so-called "commercial grade" or "crude" titanium tetrachloride.

Crude titanium tetrachloride, as manufactured and sold as an article of commerce, is a relatively impure product which has a decidedly deep yellow color. This material may be commercially prepared by processes involving the chlorination of titaniferous iron ores or rutile ores and invariably the product is contaminated by various impurities which are likewise chlorinated or are carried over with the titanium values.

The crude titanium tetrachloride is unsuitable as a raw material in various processes which demand high purity, such as in the manufacture of titanium metal, titanium pigments, and other titanium compounds. In these processes the crude titanium tetrachloride must be purified before it can be utilized.

Operational difficulties are usually encountered in prior methods for the purification of titanium tetrachloride because of the type and nature of the treating agents employed. Some of the treating agents are added in large quantities to the titanium tetrachloride which in itself is uneconomical, while other agents form sticky and gummy masses which are inconvenient and not easily handled. Another difficulty sometimes encountered is in the loss of unrecoverable titanium tetrachloride which is retained by the residual treating agent. These and other difficulties are overcome by the process of the present invention.

An object of this invention is to present an improved method for the purification of titanium tetrachloride. A further object is to purify crude titanium tetrachloride in a convenient and economical manner. Another object is to purify titanium tetrachloride by a process which involves minimum handling losses. These and other objects will become apparent from the following more complete description of this invention.

In its broadest aspects this invention contemplates purifying crude titanium tetrachloride by contacting the crude titanium tetrachloride simultaneously with an alkaline earth metal hydroxide excluding magnesium and at least one compound selected from the group consisting of the hydroxides of the alkali metals, magnesium, aluminum, titanium and chromium, and subsequently recovering the purified titanium tetrachloride as a condensate. Utilization of the hydroxides of the alkali metals and magnesium are more fully described and claimed in co-pending application Serial Number 87,112, filed April 12, 1949.

It has further been discovered that the crude titanium tetrachloride may be purified in the vapor phase by contacting the crude vapors with the above-identified combination of treating agents and subsequently recovering the purified titanium tetrachloride as a condensate.

This invention contemplates contacting crude titanium tetrachloride with a combination of hydroxide treating agents, at least one treating agent from each of the two groups mentioned above. The treating agents from the two groups must be simultaneously in contact with the crude titanium tetrachloride to obtain the desired purification effect. When the treating agents are used separately or singly, the crude titanium tetrachloride remains in an impure state with no substantial reduction of the impurities present. The simultaneous presence of at least one treating agent from each of the two groups in the present invention results in a synergistic purification effect which cannot be accomplished by the separate or single use of the respective treating agents.

One group of hydroxide treating agents utilized in the instant invention consists of the alkaline earth metal hydroxides excluding magnesium. The term "alkaline earth metal hydroxides excluding magnesium" includes hydroxides of calcium, strontium and barium and does not include magnesium, which normally may or may not be considered an alkaline earth metal. The other group of hydroxide treating agents includes the following compounds: $Al(OH)_3$, $Cr(OH)_3$ and $Ti(OH)_4$. These compounds are referred to as hydrous oxides, hydrates and hydrated oxides as, for example, titanium hydrate, $Ti(OH)_4$ also since some of the above compounds are amphoteric, they are sometimes referred to as acids, as for example, titanic acid $H_4TiO_4$, which in a partially dehydrated form is known as meta titanic acid $H_2TiO_3$.

The quantity of the treating agents used is directly dependent upon the type of starting material employed. It is obvious that the more impurities present in the crude titanium tetrachloride, the greater the quantity of treating agents required for their removal. A typical example of the range of treating agents necessary for the removal of impurities, such as vanadium and silica, from a crude titanium tetrachloride is as follows:

A particular sample of crude titanium tetrachloride contains 0.06% SiO₂ and 0.004% vanadium. With this type of starting material, the sum of the treating agents required for purification is from about 0.5% to 2.0%, preferably from about 1.0% to 1.5% based on the weight of the crude titanium tetrachloride containing more impurities than those present in the examples cited above, additional quantities of treating agents must be added. In extreme cases when using a crude titanium tetrachloride which contains exceptionally large amounts of impurities, it may be necessary to add up to about 10% of combined treating agents based on the weight of the crude titanium tetrachloride to obtain an effective removal of the impurities.

As previously stated, a combination of treating agents must be used instead of a single treating agent. With respect to the required proportions of the respective agents used in the combination, it has been found that effective results are obtained if from ⅓ part to 3 parts, preferably ½ part to 2 parts, of the alkaline earth metal hydroxides are selected for each part of the second group consisting of the hydroxides of aluminum, titanium and chromium, however; when badly contaminate crude titanium tetrachloride is used, which necessitates the use of large quantities of the combination of treating agents, from 1/10 part to 10 parts of the alkaline earth hydroxides may be selected for each part of the second group.

According to the preferred embodiment of this invention, the crude titanium tetrachloride is contacted simultaneously with a small quantity of the treating agents. The treated titanium tetrachloride is heated to boiling and distilled to obtain a purified titanium tetrachloride condensate. By the process of this invention the crude titanium tetrachloride is converted from an unsuitable material to a commercially acceptable product. The purified product possesses a water-white color.

Many of the prior art purification methods require extended refluxing periods before the added treating agents have had sufficient time to take effect, but according to this invention the only time required is that of heating the liquid in the presence of the treating agents to the boiling temperature and during the subsequent distilling operation to obtain a purified product.

The combination of purifying treating agents used in the process of this invention remain substantially in suspension and in finely-divided form in the liquid titanium tetrachloride and therefore mechanical agitation is not essential. These treating agents do not stick to the walls of the still and since they are added in small quantities, the still bottoms comprise a small non-sticky loose mass which may be easily removed from the still. With this type of still bottom, the handling loss of the titanium tetrachloride is held to a minimum.

To further illustrate this invention the following examples are presented:

EXAMPLE I 1000 grams of crude titanium tetrachloride were placed in a glass distilling flask. 0.5% calcium hydroxide and 0.5% of titanium hydrate based on the weight of the titanium tetrachloride were added to the titanium tetrachloride at room temperature. The mixture was then rapidly heated to boiling and distilled at normal pressure out of contact with the outside atmosphere. The distillate was condensed and analyzed. The entire procedure was carried out in glass apparatus to prevent contamination. The purified titanium tetrachloride possessed a water-white color. The analytical data are presented in Table I.

EXAMPLE II

Example I was repeated using 0.5% of calcium hydroxide and 0.5% of aluminum hydroxide as treating agents. Again the product was water-white. The data are presented in the table.

Substantially equal results to those shown in the table were obtained using calcium hydroxide in combination with chromium hydroxide.

*Table*

| Example Number | Per Cent Treating Agents Added | Color | Impurities in Distillate | |
|---|---|---|---|---|
| | | | Per cent SiO₂ | Per cent V |
| I | 1.0% Ca(OH)₂+titanium hydrate | water-white | .008 | .0008 |
| II | 1.0% Ca(OH)₂+Al(OH)₃ | do | .017 | <.0008 |
| Untreated Crude TiCl₄ | | yellow | .06 | .004 |

Purifications of the crude titanium tetrachloride also were carried out in the vapor phase by contacting crude titanium tetrachloride vapors with a heated bed containing these combinations of treating agents. The temperature of the treating agents utilized in these purifications should be maintained below the normal decomposition temperature of the respective treating agents.

Example of the vapor phase purifications is presented as follows:

EXAMPLE III 1000 grams of the same crude titanium tetrachloride were vaporized and the vapors were allowed to contact a bed of a combination of treating agents heated to 300° C.; the combination of treating agents consisted of 1.4% of calcium hydroxide and 0.5% of titanium hydrate. The purified product was then condensed and analyzed. The product was water-white in color and contained <0.008% vanadium.

Hence, it is evident that crude titanium tetrachloride purified by the process of this invention will be converted to a water-white product. The impurities particularly vanadium have been eliminated to the extent that the purified titanium tetrachloride becomes a commercially acceptable product. It has further been shown that the process is convenient and economical because the combinations of treating agents used are inexpensive, they are added in small quantities, and they do not form sticky or bulky still bottoms. The finely-divided and non-sticky treating agent mass may be easily removed from the still. The titanium tetrachloride removed with the treating agent mass is easily recovered from the mass by heating and is returned to the system. The ability to heat the treating agents without sticking to the walls of the vessels and without retaining an appreciable amount of titanium tetrachloride in the residual treating agents result in minimizing the titanium tetrachloride handling losses of the process.

This application is a division of Serial Number 87,112 filed April 12, 1949, now Patent No. 2,560,423.

While this invention has been described and illustrated by the examples shown, it is not intended to be strictly limited thereto and other modifications and variations may be employed within the scope of the following claims.

I claim:

1. A method for the purification of titanium tetrachloride which comprises contacting, at a temperature at least as high as the boiling point of titanium tetrachloride, crude titanium tetrachloride simultaneously with an alkaline earth metal hydroxide excluding magnesium and at least one compound selected from the group consisting of the hydrated oxides of aluminum, titanium and chromium, and subsequently recovering the purified titanium tetrachloride as a condensate.

2. The method according to claim 1 in which the sum of the treating agents is present in amount from 0.5% to 10.0% of the weight of the titanium tetrachloride.

3. The method according to claim 2 in which from ⅓ part to 3 parts of said alkaline earth metal hydroxide are present for each part of the compound selected from the hydroxides of aluminum, titanium and chromium.

4. A method for the purification of titanium tetrachloride which comprises contacting, at a temperature at least as high as the boiling point of titanium tetrachloride, crude titanium tetrachloride simultaneously with an alkaline earth metal hydroxide excluding magnesium and at least one compound selected from the group consisting of the hydrated oxides of aluminum, titanium and chromium, and subsequently distilling the purified titanium tetrachloride as a condensate.

5. A method for the purification of titanium tetrachloride which comprises contacting crude titanium tetrachloride vapors simultaneously with an alkaline earth metal hydroxide excluding magnesium and at least one compound selected from the group consisting of the hydrated oxides of aluminum, titanium and chromium and subsequently recovering the purified titanium tetrachloride as a condensate.

6. A method for the purification of titanium tetrachloride which comprises contacting, at a temperature at least as high as the boiling point of titanium tetrachloride, crude titanium tetrachloride simultaneously with an alkaline earth metal hydroxide, excluding magnesium, and hydrated titanium oxide, and subsequently recovering the purified titanium tetrachloride as a condensate.

7. A method for the purification of titanium tetrachloride which comprises contacting, at a temperature at least as high as the boiling point of titanium tetrachloride, crude titanium tetrachloride simultaneously with an alkaline earth metal hydroxide, excluding magnesium, and hydrated aluminum oxide, and subsequently recovering the purified titanium tetrachloride as a condensate.

8. A method for the purification of titanium tetrachloride which comprises contacting, at a temperature at least as high as the boiling point of titanium tetrachloride, crude titanium tetrachloride simultaneously with an alkaline earth metal hydroxide, excluding magnesium, and hydrated chromium oxide, and subsequently recovering the purified titanium tetrachloride as a condensate.

HELMUT ESPENSCHIED.

REFERENCES CITED

The following references are of record in the file of this patent:

UNITED STATES PATENTS

| Number | Name | Date |
|---|---|---|
| 2,207,597 | Pechukas | July 9, 1940 |
| 2,416,191 | Meister | Feb. 18, 1947 |
| 2,512,807 | Nicholson | June 27, 1950 |